United States Patent [19]
Ghisler et al.

[11] Patent Number: 5,826,193
[45] Date of Patent: Oct. 20, 1998

[54] METHOD AND APPARATUS OF FACILITATING INTERCHANGING THE USE OF A MOBILE STATION AND A PERMANENTLY WIRED TELEPHONE SET

[75] Inventors: Walter Ghisler, Båtmansvägen; Per Viktor Israelsson, Ryttarvägen; Georg William Robin Chambert, Hävelvägen, all of Sweden

[73] Assignee: Telefonaktiebolaget LM Ericsson, Stockholm, Sweden

[21] Appl. No.: 936,273

[22] Filed: Aug. 28, 1992

[30] Foreign Application Priority Data

Aug. 30, 1991 [SE] Sweden .................................. 9102514

[51] Int. Cl.⁶ ..................................................... H04Q 7/38
[52] U.S. Cl. .......................... 455/445; 379/211; 379/436; 379/450
[58] Field of Search ......................... 340/825.35; 379/56, 379/57, 58, 61, 63, 210, 211, 62; 455/103, 445; 235/462

[56] References Cited

U.S. PATENT DOCUMENTS

| | | | |
|---|---|---|---|
| 2,236,997 | 4/1941 | Feinberg | 379/436 |
| 2,705,264 | 3/1955 | Gendron | 379/450 |
| 3,184,548 | 5/1965 | Krulwich | 379/450 |
| 3,368,296 | 2/1968 | Edwards | 379/450 |
| 4,535,204 | 8/1985 | Hughes et al. | 235/462 |
| 4,691,339 | 9/1987 | Redman et al. | 379/62 |
| 4,807,279 | 2/1989 | McClure et al. | |
| 5,115,463 | 5/1992 | Moldausky et al. | 379/58 |
| 5,222,123 | 6/1993 | Brown et al. | 379/57 |

FOREIGN PATENT DOCUMENTS

| | | |
|---|---|---|
| 0317496 | 9/1988 | European Pat. Off. . |
| 38 14 728 | 11/1989 | Germany . |
| 38 43 870 | 6/1990 | Germany . |
| 0007648 | 1/1990 | Japan .................. 379/56 |
| 462824 | 9/1988 | Sweden . |
| 2 235 077 | 2/1991 | United Kingdom . |
| 2004798 | 3/1992 | WIPO ................. 379/211 |
| 3017516 | 9/1993 | WIPO ................. 379/58 |

OTHER PUBLICATIONS

K. Kaminski, "Streckkodsläsare för Telefonapparat DBA 620", Linkopings Tekniska Hogskola, Institutionen for Systemteknik, Ellemtel utvecklingsaktiebolag (1983).

*Primary Examiner*—William Cumming
*Attorney, Agent, or Firm*—Burns, Doane, Swecker & Mathis, L.L.P.

[57] ABSTRACT

A method of facilitating interchanging the use of a mobile station and a permanently wired telephone set includes providing the number of the permanently wired telephone set as a bar code near the telephone set. A bar code reader is connected to the mobile station for scanning the bar code for ordering of interchanging the mobile station and the permanently wired set without dialing the number on a keyset of the mobile station. A predetermined interchanging key on the keyset is designated and connected for ordering the interchanging. The interchange is initiated by scanning the bar code with the bar code reader and pressing the interchanging key.

15 Claims, 4 Drawing Sheets

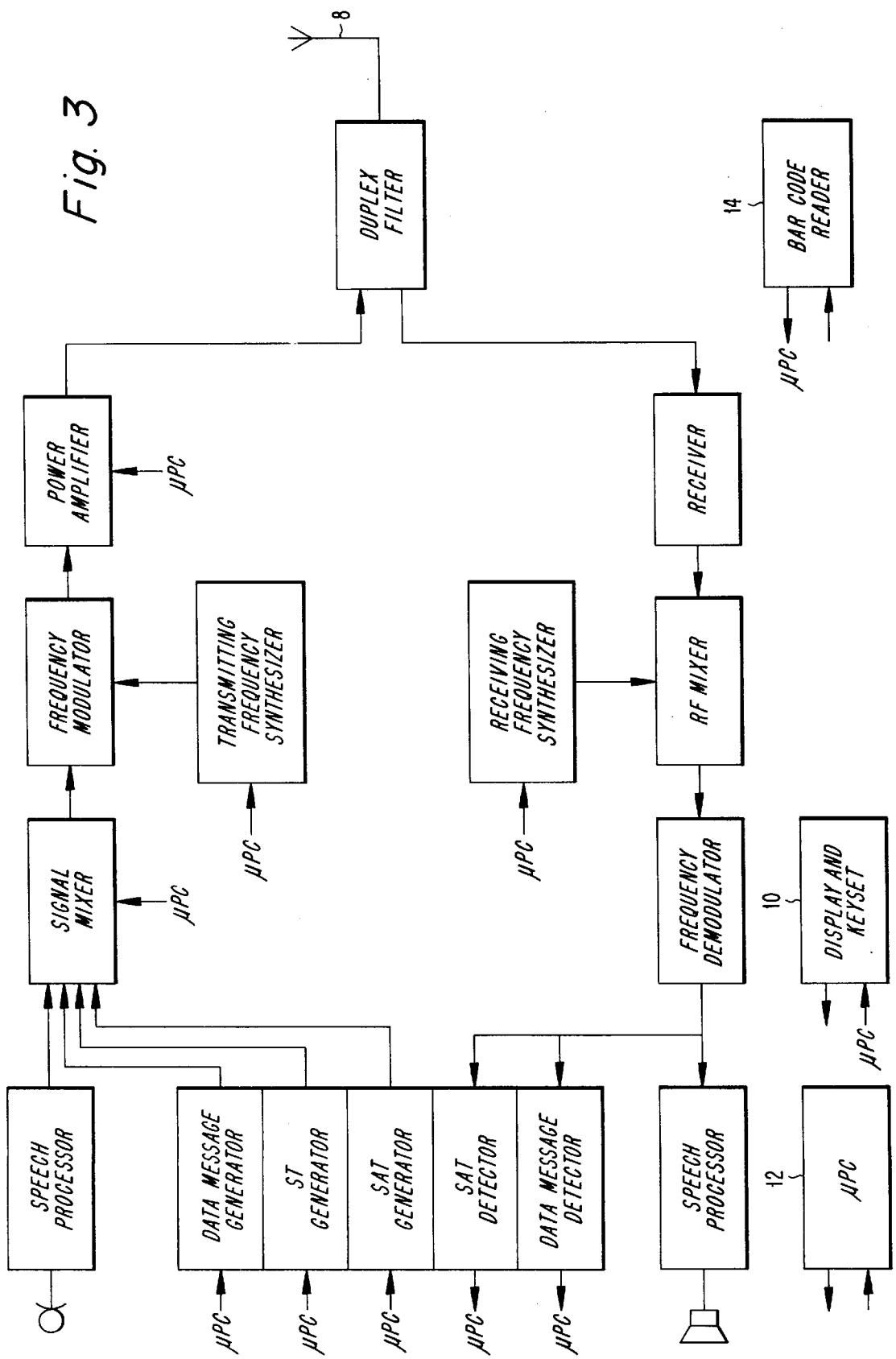

METHOD AND APPARATUS OF FACILITATING INTERCHANGING THE USE OF A MOBILE STATION AND A PERMANENTLY WIRED TELEPHONE SET

BACKGROUND

The present invention concerns a method of facilitating interchanging the use of a mobile station and a permanently wired telephone set, said mobile station being equipped with a keyset and circuits connected thereto for controlling and performing desired functions, said keyset in addition to dialling and the like also permitting ordering such interchange in a telephone network system which includes the permanently wired telephone set and which has functions for permitting interchange in response to a request from the mobile station. The invention also concerns a mobile station and a telephone set, respectively, which can be used for performing the method.

Interchanging methods of the type defined above are known and enable mobile telephone subscribers to handle their communication either via the mobile telephone set or via telephone sets connected to the public switch telephone network (PSTN). However, these interchange methods are complicated, which deters from their use.

If interchanging occurs when no call is in progress the function is called "temporary transfer" which signifies that calls received by a telephone set, for example a mobile telephone set, are redirected to a selectable other telephone set, for example a permanently wired telephone set. If interchanging occurs during a call the function is called "call pick-up" and is known from private branch exchanges (PABX), for example Ericsson's MD110 System, in which interchanging can be performed between two permanently wired telephone sets. In the following "temporary transfer" will be described first and thereafter "call pick-up" as the method is at present.

The routine presently used for performing temporary transfer in the Nordic Mobile Telephone Network NMT, i.e. arranging such that calls received by a mobile telephone set are re-directed to a selectable permanently wired telephone set, and routines used at present for resetting temporary transfer are the following:

1) Ascertain the complete number of the permanently wired telephone set. The subscriber's number is often given somewhere on the set but normally not the area code which has to be looked up or requested if it is not known. Assume that the number is 076032843.

2) Touch *21*076032843# on the mobile telephone and verify on the display that the information is correct. *21* signifies a request for the service "temporary transfer", 076032843 is the complete telephone number including the area code number, and # concludes the message.

3) Transmit the information by pressing the key for SEND/END. Wait for an indication from an answering machine confirming that temporary transfer is in operation. An indicator in the form of an arrow is shown on the display as a reminder that temporary transfer is in operation.

4) Resetting temporary transfer, i.e. that incoming calls are to be received in the mobile telephone set again, is achieved by touching #21# and pressing the key for SEND/END.

If calls often have to be transferred temporarily to specific telephone numbers, for example to the home and to the office, this can be done faster and simpler than described above if both the connecting sequences and the disconnecting sequences have been stored in the memory for abbreviated numbers which is included in most mobile stations. For example in NMT this is done as follows:

1) Store the relevant sequences in memory places 87,88, and 89, respectively, in the same manner as telephone numbers are stored in the memory for abbreviated numbers by touching *21*HOME NUMBER# and *21*OFFICE NUMBER# and #21# on the keyset of the mobile station.

2) These abbreviated numbers (87,88, and 89, respectively) can thereafter be used when temporary transfer is to be connected or disconnected by touching "87 RECALL SEND/END" for connecting temporary transfer to the home, "88 RECALL SEND/END" for connecting temporary transfer to the office, and "89 RECALL SEND/END" for disconnecting temporary transfer, wherein RECALL and SEND/END are keys with these designations on the NMT mobile station.

The routine presently used for call pick-up in Ericsson's private branch exchange MD110 is the following:

1) Ask the person you are calling to wait, press the key R and wait for dial tone. This is called parking calls.

2) Replace the handset and make a notation of the (internal) number of the telephone set.

3) Pick up the handset of the telephone you wish to receive the call on and press the number of the telephone set where the call has been parked and of which you have made a notation. Busy tone is heard.

4) Press 6. The call is recovered.

In a Graduate Study at Linköpings Tekniska Högskola, Institutionen för systemteknik, carried out in 1983 at ELLEMTEL utvecklingsaktiebolag by Krzysztof Kaminski, a method of reading a bar coded telephone number with a bar code reader connected to a permanently wired telephone set and thereafter calling a subscriber by means of the tone selector circuit without dialling is disclosed. Mention is also made of the possibility of reading data with the bar code reader and transferring said data by tone signalling without having to use the keyset. However, using bar code readers in connection with mobile telephony or temporary transfer or interchanging telephone sets is not disclosed.

In Swedish Patent Application 8701095-5 by S Kjellquist transferring data over the public switch telephone network (PSTN) in one direction using bar code readers and tone signalling and transferring information from an answering machine in the other direction are disclosed. Use in connection with mobile telephony or temporary transfer or call pick-up is also not disclosed in this case.

SUMMARY

It is an object of the invention to enable increased use of the function "temporary transfer" from mobile stations to telephone sets in the public switch telephone network (PSTN) in order to conserve the batteries of the mobile stations and to decrease the congestion or to increase the capacity of the mobile telephone networks.

It is another object of the invention to facilitate the function "call pick-up" between mobile stations and permanently wired telephone sets during calls. This function may be needed in order to improve the signal quality or for the sake of mobility.

The characteristics of the invention by means of which the above-mentioned objects are achieved are defined by the claims.

According to the invention permanently wired telephone sets are provided with labels carrying the own area code and subscriber's number of the telephone set both in digits and as a bar code. Bar code readers are connected to the mobile telephone sets with the new function in accordance with the invention. When a user of such mobile telephone set wishes to redirect an incoming call to a permanently wired telephone set which is located close by, the user reads the bar code of said telephone set by pressing a key on the mobile telephone set or the bar code reader and pointing the bar code reader to the bar code of the permanently wired telephone set. Without any further action on the part of the mobile subscriber the mobile telephone set will then in accordance with the invention call the network system and request temporary transfer to the permanently wired telephone set whose telephone number has just been read. Short acoustic signals in the mobile station indicate on the one hand when the bar code reader has succeeded in reading the bar code and on the other hand when the network system has performed the temporary transfer.

In a preferred embodiment the key on the mobile telephone set which is pressed is its ON/OFF key, and it is utilized as follows:

If the mobile telephone subscriber wishes to arrange temporary transfer in connection with the subscriber switching off the mobile station the subscriber points the built-in bar code reader towards a bar code and presses the key. If the bar code reader does not identify any bar code only disconnection occurs. Otherwise temporary transfer is performed as disclosed above, whereafter the mobile station is switched off. In the preferred embodiment temporary transfer initiated by the bar code being read is nullified by the mobile station being connected again, which has the advantage that temporary transfers which by mistake have not been reset seldom occur.

If the mobile telephone subscriber wishes to redirect incoming calls to a telephone set which is not in his/her immediate vicinity, for example the telephone set of a secretary, this may appropriately be carried out by the conventional methods for temporary transfer which have been described above. These temporary transfers are not nullified by the mobile station being turned on.

Call pick-up from a mobile telephone set to a permanently wired telephone set, regardless of whether pick-up is carried out on the A side or the B side, i.e. the side of the called subscriber or the calling subscriber, is performed as follows:

1) Point the bar code reader of the mobile telephone set at the bar code label of the permanently wired telephone set while pressing a predetermined key, for example 6. Wait for acoustic acknowledgement, for example a tone in the mobile telephone set, indicating that the permanently wired telephone set is connected.

2) Lift the handset of the permanently wired telephone set and take the call. The connection to the mobile telephone set will be disconnected by the network system when the handset is picked up. Switch off the mobile station thereafter.

Changing the telephone from a permanently wired telephone set to a mobile telephone, regardless of whether the change occurs on the A side or the B side, is carried out as follows:

1) Switch on the mobile telephone set, point the bar code reader of the mobile telephone set towards the bar code label of the permanently wired telephone set while pressing the same predetermined key as in the opposite change of telephone, for example 6, as described above.

2) Wait for acoustic acknowledgement, for example a tone in the permanently wired telephone set, that the network system has comprehended the task. Then replace the handset, whereby the call will be forwarded to the mobile station and will continue from there.

BRIEF DESCRIPTION OF THE DRAWINGS

The invention will be disclosed more specifically below with reference to the accompanying drawings in which FIG. 3 shows a schematic block diagram of the mobile station according to FIG. 2, FIG. 4A and 4B show flow diagrams for temporary transfer and resetting temporary transfer when bar code readers are used.

DETAILED DESCRIPTION

Figure 2:
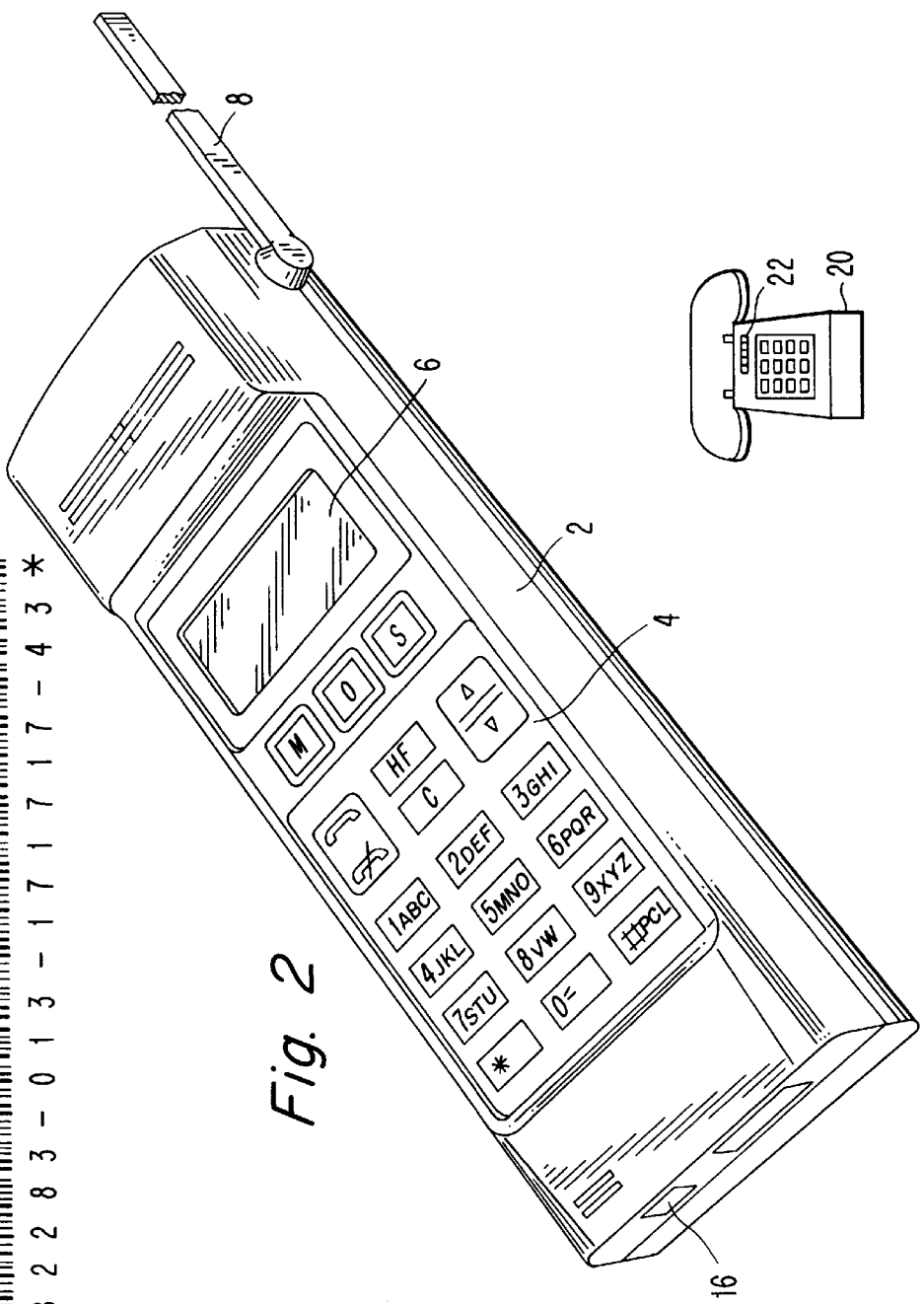
FIG. 2 shows an isometric view of the exterior of a hand held apparatus belonging to an analog mobile station provided with a bar code reader.

Reference is now first made to FIGS. 2 and 3. The apparatus illustrated in FIG. 2 has a keyset 4 and a display 6 in a casing 2 and exhibits an antenna 8. The function, design, and mutual relationship of the mentioned elements are well known to a person skilled in the art to the extent that they are not applicable to the disclosed invention, and therefore they do not have to be described more specifically here. The same is the case of the circuits enclosed in the casing. Briefly, however, the keyset 4 and the display 6 form part of a unit 10 which is connected to a microprocessor 12 intended for controlling and performing desired functions which have been selected by means of keyset 4. In addition to dialling and the like, the function keys of the keyset also permit ordering interchanging to and from permanently wired telephone sets in a telephone network system which has functions for performing interchanging upon request of the mobile station.

According to one of the characteristics of the invention a bar code reader 14 is connected to the mobile station and more particularly to microprocessor 12 in similar manner as unit 10 so that it can send characters to the microprocessor which correspond to the ones achieved by pressing the keys of keyset 4. Connection can be carried out in manner similar to what has been described in the Graduate Study mentioned and.

Furthermore, according to another characteristic the connection of the bar code reader 14 is such that in scanning a bar coded telephone number therewith it becomes possible to order a measure of interchanging, i.e. temporary transfer or call pick-up, to or from the mobile station of a telephone set 20 having this telephone number without dialling by means of the keyset. Microprocessor 12 is designed such as to check whether a read bar code is valid and, if this is the case, to activate a predetermined sequence of signals containing the relevant telephone number via the tone generator of the mobile station.

According to a preferred embodiment bar code reader 14 is built into casing 2 with its "eye" designated 16 positioned in one of the end surfaces of casing 2.

The bar code reader may be of a type used in commercial bar code readers of pen type, for example Hewlett Packard HEDS-3000 or more modern variants thereof. More information concerning different bar code readers may be found in the Graduate Study mentioned by way of introduction.

According to an additional characteristic of the invention, permanently wired telephone sets in the network are to have in close proximity whenever necessary a bar coded representation of the telephone number for facilitating interchanging to a permanently wired telephone set in a telephone network system of the type mentioned above. The bar code is preferably displayed on a label 22 positioned on the set.

Figure 1:
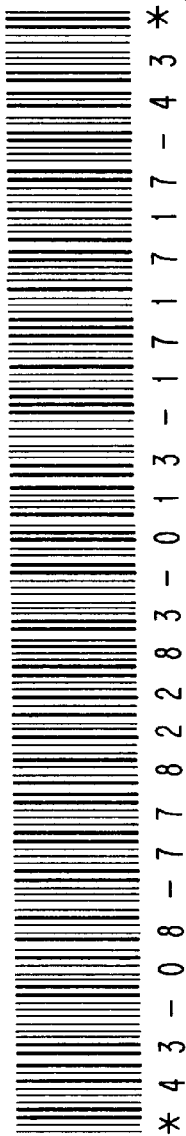
FIG. 1 shows a possible bar code for telephone number representation on labels for permanently wired telephone sets.

FIG. 1 shows one possible such bar code. A telephone number including the area code normally does not have more than ten digits. Counting with twelve characters the bar code has a length of 74 millimeters. The code is printed on a label, and the label is fastened to or at the permanently wired telephone set with this number as illustrated in FIG. 2. The suggested code is alphanumeric and is called "Code 39". It is designated such in consequence of each character in the code being represented by nine elements, viz. five dark bars and four light spaces between them. Three of these nine elements are wide and correspond to the binary value 1 whereas the remaining six are narrow and correspond to the binary value 0, i.e. three elements of totally nine are wide. Additional details regarding the code and why it is appropriate for the present application are explained in the Graduate Study mentioned above.

In addition to what has been disclosed above the functions of the mobile station shown in FIG. 3 can be of known design per se. However, the blocks in FIG. 3 schematically illustrate the different functions. A more specific disclosure can be had from allowed U.S. patent application Ser. No. 670,237B, "Neighbor-Assisted Handoff in a Cellular Communication System" by Wejke et al (See FIG. 2 and page 7, line 21 to page 10, line 32) now U.S. Pat. No. 5,175,867.

The preferred embodiment of the invention will be described here with an analog mobile station. However, the invention can be used with all variants of mobile stations in different standards, for example dual-mode mobile stations according to U.S. Standard IS-54, digital mobile stations according to European GSM standard, office mobile stations according to DECT standard.

The method of the invention in practice will now be described more specifically below with reference to FIGS. 4A–5B whose flow diagrams illustrate to a person skilled in the art how microprocessor 12 is to be programmed for controlling and performing the various functions.

Figure 4A:
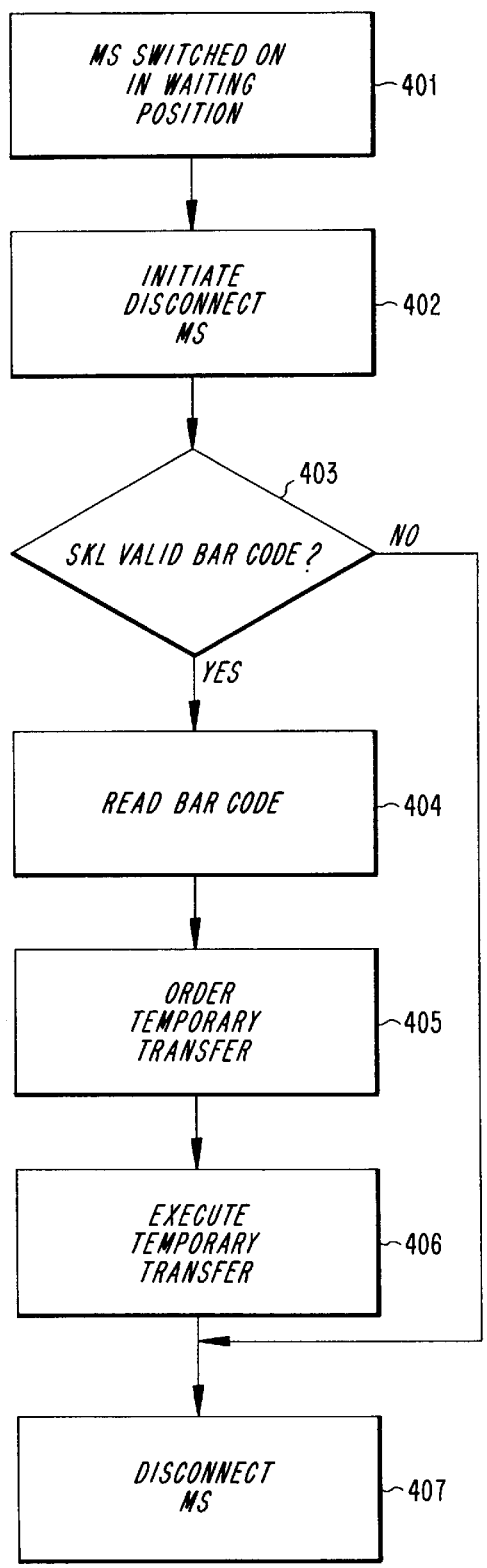
Figure 4B:
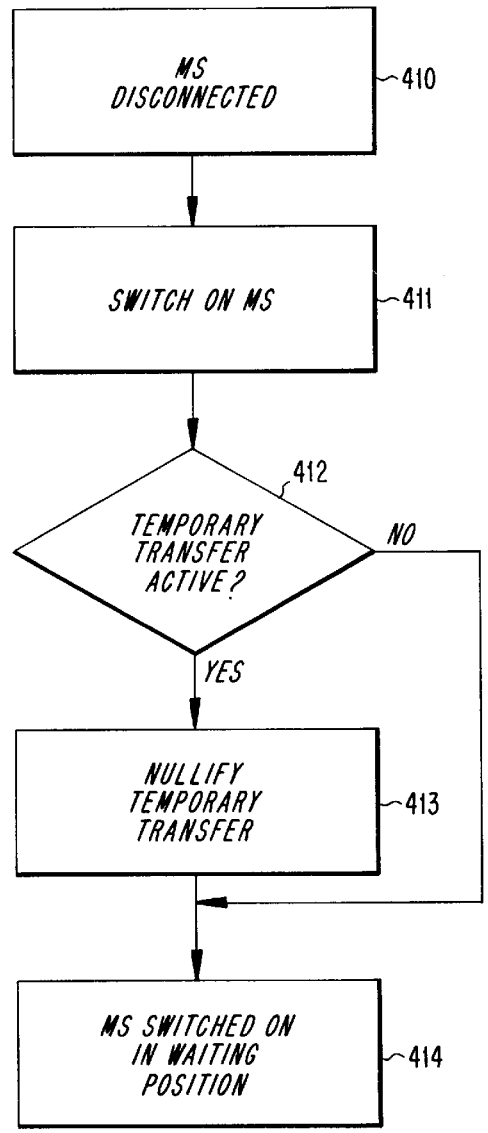

FIGS. 4A and 4B shows flow diagrams for temporary transfer and resetting temporary transfer to a permanently wired telephone set equipped with a bar code strip. In FIG. 4A, starting block 401 begins with the situation in which mobile station MS is in waiting position, i.e. it is switched on but no call is in progress. Block 402 signifies that the user, when the eye 16 of bar code reader 14 (SKL in the figure) is directed at the permanently wired telephone set, presses the key on the mobile telephone which orders disconnection, for example the ON/OFF key. The circuits of the mobile telephone investigate in block 403 whether the bar code reader reads a valid bar code. If this is not the case the mobile station is disconnected without further measures. If on the other hand a valid bar code is received, then it is read in 404, and an acoustic signal provides information of successful reading. Thereafter temporary transfer is ordered automatically in 405 of the network system with the same procedure and messages as in conventional temporary transfer according to the state of the art. The only difference is that the number to which temporary transfer is requested comes from the bar code reader rather than from the keyset. The network system executes the temporary transfer in 406, whereby incoming calls are directed to the relevant permanently wired telephone set. The network system acknowledges receipt by means of a tone signal to the mobile station. The disconnection proper of the mobile station in 407 then follows.

In block 410 in FIG. 4B, in which the description of resetting temporary transfer begins, the starting point taken is when the user has ordered disconnecting the mobile telephone or in which the mobile telephone actually is disconnected. In block 411 the user presses the key which connects the mobile telephone, for example the ON/OFF key. In block 412 the network system investigates whether temporary transfer is active, i.e. if incoming calls are being received in another telephone set than the one now connected. If this is not the case the flow goes on to block 414 but otherwise the temporary transfer is nullified in block 413, i.e. incoming calls are redirected to the relevant mobile station. Thereafter the mobile station goes to "idle"-position in block 414 which indicates that no call is in progress but that the mobile station listens for any incoming calls.

Figure 5A:
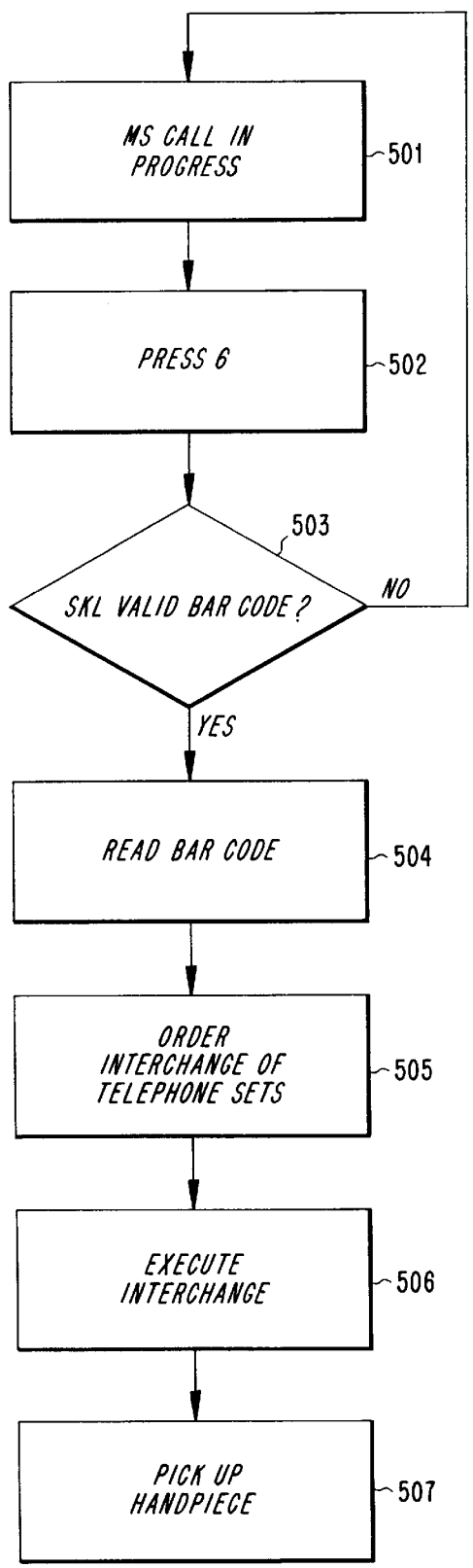
FIG. 5A and 5B shows and flow diagrams for interchanging from a mobile station to a permanently wired telephone set and the opposite during a call.
Figure 5B:
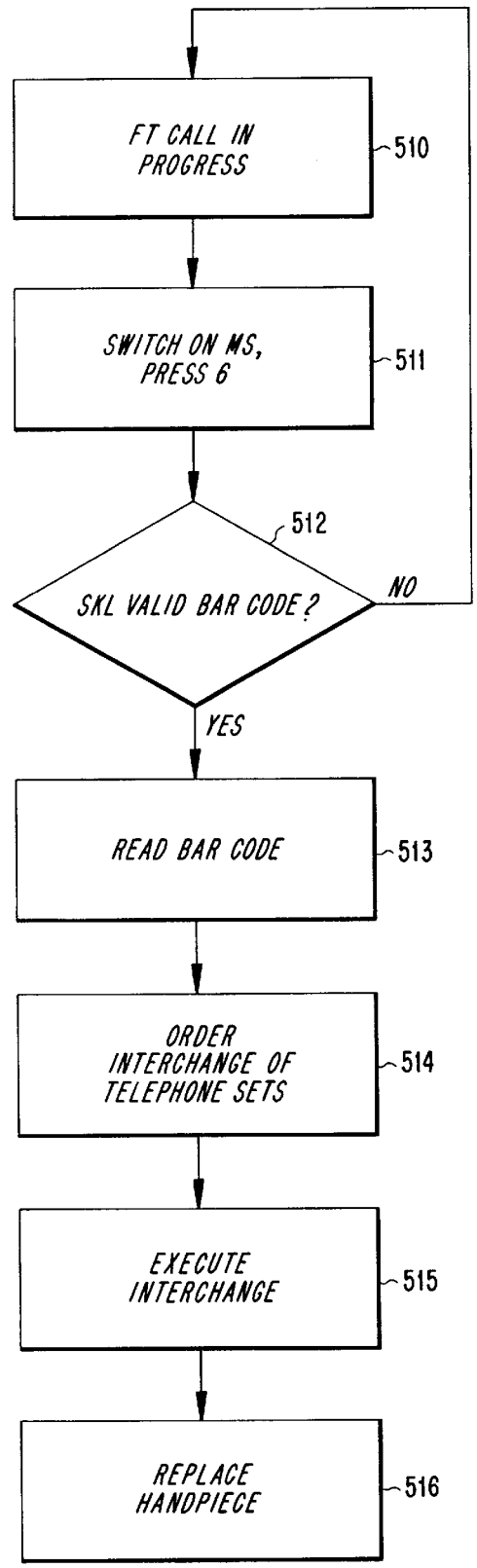

FIGS. 5A and 5B show flow diagrams for interchanging under calls from a mobile station MS to a permanently wired telephone set FT and conversely. In block 501 in FIG. 5A the starting point is taken in the situation where the mobile telephone is in call position and the user wishes to interchange to a permanently wired telephone set, for example because of radio disturbances. Block 502 indicates that the user presses a predetermined key in the mobile station, for example "6", which orders interchanging telephone sets, while bar code reader 14 (SKL in the figure) of the mobile station is directed towards the bar code of the fixed "target"-telephone set. In block 503 the circuits of the mobile telephone investigate whether the bar code reader reads a valid bar code. If this is not the case nothing happens and the flow returns to block 501. If conversely a valid bar code is received, then it is read in 504 and an acoustic signal from the mobile station provides information of successful reading. Thereafter the mobile station automatically orders "call pick-up" in block 505 of the network system with the same procedure and messages as in conventional call pick-up in private branch exchanges according to known technology. The only difference is that the number to which interchanging telephones is requested comes from the bar code reader rather than from the keyset.

The network system executes the order call pick-up in block 506, whereby the call to the permanently wired telephone set is prepared but not completed. An acoustic signal in the mobile telephone is heard. Thereafter the execution proper of interchanging is carried out in block 507 when the handset is picked up by the call being connected to the permanently wired telephone set and disconnected in the mobile station.

In block 510 in FIG. 5B, the starting point is taken in the situation where a permanently wired telephone set is used in a call and the user wishes to interchange to a mobile station, for example for continuing the call while the subscriber goes to have a look in records. Block 511 signifies that the user connects the mobile station and thereafter presses a predetermined key in it, for example "6", which orders interchanging telephones, while the bar code reader of the mobile station is held directed towards the bar code of the permanently wired "source" telephone set. The circuits of the mobile telephone set investigate in block 512 whether the bar code reader reads a valid bar code. If this is not the case then nothing happens, and the flow returns to block 510.

If contrary to this a valid bar code is received, then it is read in block 513 and an acoustic signal provides information of successful reading. Thereafter "call pick-up" is ordered in block 514 of the network system with the same procedure and messages as in the conventional interchanging of telephonesets in automatic branch exchanges according to known technology. The difference is that the interchanging is commissioned by the mobile telephone, i.e. the "target" telephoneset. Thus, the number to which interchanging the telephoneset is requested is the identity of the mobile telephoneset whereas the identity of the telephoneset from which interchanging is to be carried out comes from the bar code reader of the mobile telephone set rather than from the keyset of the permanently wired telephone set. The network system executes the order call pick-up in block 515 whereby call transfer to the mobile station is prepared but is not completed. An acoustic signal in the mobile station provides the information that the network system has received the commission. The execution proper of the interchanging follows thereafter in block 516, when the handpiece of the permanently wired telephone set is replaced, by the call being connected to the mobile station and being disconnected from the permanently wired telephone set.

The described preferred embodiment give examples of services comprising interchanging between mobile stations and permanently wired telephone sets and the contrary. A simplified establishment of a three party call can also be envisioned, which can be considered as "interchanging" telephone sets in which the first telephone set that is connected is not disconnected.

What is claimed is:

1. A method of facilitating interchanging the use of a mobile station and a permanently wired telephone set, said mobile station being equipped with a keyset and circuits connected thereto for controlling and performing desired functions, said keyset in addition to dialling also permitting ordering of such interchanging in a telephone network system which includes the permanently wired telephone set and which permits interchanging upon request from the mobile station, comprising the steps of:

providing a number of said permanently wired telephone set as a bar code nearby said permanently wired telephone set, connecting a bar code reader to said mobile station for scanning said bar code for ordering of interchanging the mobile station and said permanently wired set without dialling said number by means of said keyset, designating and connecting a predetermined interchanging key on said keyset as a means for ordering said interchanging, and initiating said interchanging by scanning said bar code with said bar code reader and pressing said interchanging key.

2. A method in accordance with claim 1, further comprising the steps of:

designating and connecting a predetermined temporary transfer key on said keyset as a means for initiating a temporary transfer by interchanging the mobile station to the permanently wired telephone set when the mobile station is on without a call being in progress and for initiating resetting from the temporary transfer.

3. A method in accordance with claim 2, comprising the following steps for temporary transfer:

a) pressing said temporary transfer key while pointing the bar code reader towards the bar code of the permanently wired telephone set, b) automatically ordering the temporary transfer if a valid bar code is read, and c) performing the temporary transfer and switching off the mobile station.

4. A method in accordance with claim 2 comprising the following steps for resetting a temporary transfer:

a) switching on the mobile station by pressing the temporary transfer key, b) determining whether the temporary transfer is active, i.e. if an incoming call would be received in the permanently wired telephone set, and c) resetting the temporary transfer and transferring, when the incoming call is received, the incoming call to the mobile station.

5. A method in accordance with claim 2, wherein a mobile station ON/OFF key on said keyset is used as said temporary transfer key.

6. A method in accordance with claim 1, further comprising the steps of designating and connecting a predetermined call pick-up key on said keyset as a means for initiating a call pick-up by interchanging the mobile station and the permanently wired telephone set when the mobile station is on when a call is in progress.

7. A method in accordance with claim 6, wherein a call pick-up is performed without disconnecting the telephone set which was first connected.

8. A method in accordance with claim 6 comprising the following steps for a call pick-up of a call in progress from the mobile station to the permanently wired telephone set:

activating said predetermined call pick-up key while directing the bar code reader towards the bar code of the permanently wired telephone set, checking that a valid bar code is read and ordering call-pick up in the network in response to a valid bar code, and executing the call pick-up by lifting a handpiece of the permanently wired telephone set.

9. A method in accordance with claim 6 comprising the following steps for call pick-up of a call in progress from the permanently wired telephone set to the mobile station:

with the mobile station on, actuating the predetermined call pick-up key while directing the bar code reader towards the bar code of the permanently wired telephone set, checking that a valid bar code is read and ordering call pick-up in the network in response to a valid bar code, and executing the call pick-up by replacing a handpiece of the permanently wired telephone set.

10. A mobile station comprising a keyset and means connected thereto for controlling and performing desired functions, said keyset in addition to dialing also permitting ordering interchanging to a permanently wired telephone set in a telephone network system, and a bar code reader for facilitating interchanging the mobile station and a permanently wired telephone set in the network, a number of the permanently wired telephone set being provided in the proximity thereof in the form of a bar code, said bar code reader being connected to the mobile station for scanning of such bar coded number for ordering of interchanging the mobile station and the telephone set without dialing the number by the keyset, said bar code reader further comprising a function key on said keyset designated and connected for initiating said interchanging.

11. A mobile station in accordance with claim 10, further comprising a predetermined temporary transfer key for initiating a temporary transfer by interchanging of the mobile station and the permanently wired telephone set when the mobile station is on without a call being in progress and for initiating resetting from a temporary transfer.

12. A mobile station in accordance with claim 11, wherein an ON/OFF key of the mobile station keyset is used as said temporary transfer key.

13. A mobile station in accordance with claim 10 comprising a call pick-up key for initiating call pick-up in both directions of a call in progress between the mobile station and the permanently wired telephone set.

14. A mobile station in accordance with claim 10, wherein the bar code reader is disposed in the mobile station and has a scanning eye located in a surface of the mobile station.

15. A mobile station in accordance with claim 10 comprising circuit means for investigating in the mobile station whether a valid bar code is read.

* * * * *